Jan. 30, 1951 R. R. SMITH 2,540,014
MACHINE FOR EXTRACTING JUICES FROM CITRUS FRUIT
Original Filed April 4, 1945 3 Sheets-Sheet 2

INVENTOR.
RALSTON R. SMITH
BY
Mellin, Aurich & Hanscom
ATTYS.

Jan. 30, 1951 R. R. SMITH 2,540,014
MACHINE FOR EXTRACTING JUICES FROM CITRUS FRUIT
Original Filed April 4, 1945 3 Sheets-Sheet 3

INVENTOR.
RALSTON R. SMITH
BY
Mellin, Auriel & Hanscom
ATTYS.

Patented Jan. 30, 1951

2,540,014

UNITED STATES PATENT OFFICE 2,540,014

MACHINE FOR EXTRACTING JUICES FROM CITRUS FRUIT

Ralston R. Smith, Vallejo, Calif.

Continuation of application Serial No. 586,509, April 4, 1945. This application June 26, 1948, Serial No. 35,324

4 Claims. (Cl. 146—3)

This application is a continuation of my application entitled "Machine for Extracting Juices from Citrus Fruits," filed April 4, 1945, bearing Serial No. 586,509, and now abandoned.

This invention relates to machines for extracting juices from citrus fruits.

It is the principal object of my present invention to provide an improved and simplified apparatus for rapidly and efficiently extracting the juices from citrus fruits with a minimum of contamination of the fruit juices by the juice of the rind, fiber and seeds.

It is a further object of my invention to provide a machine of the character referred to so constructed as to eliminate the necessity of precise timing and synchronous operation between the various operating elements.

One form which the invention may assume is exemplified in the following description and illustrated by way of example in the accompanying drawings, in which.

Figure 1:
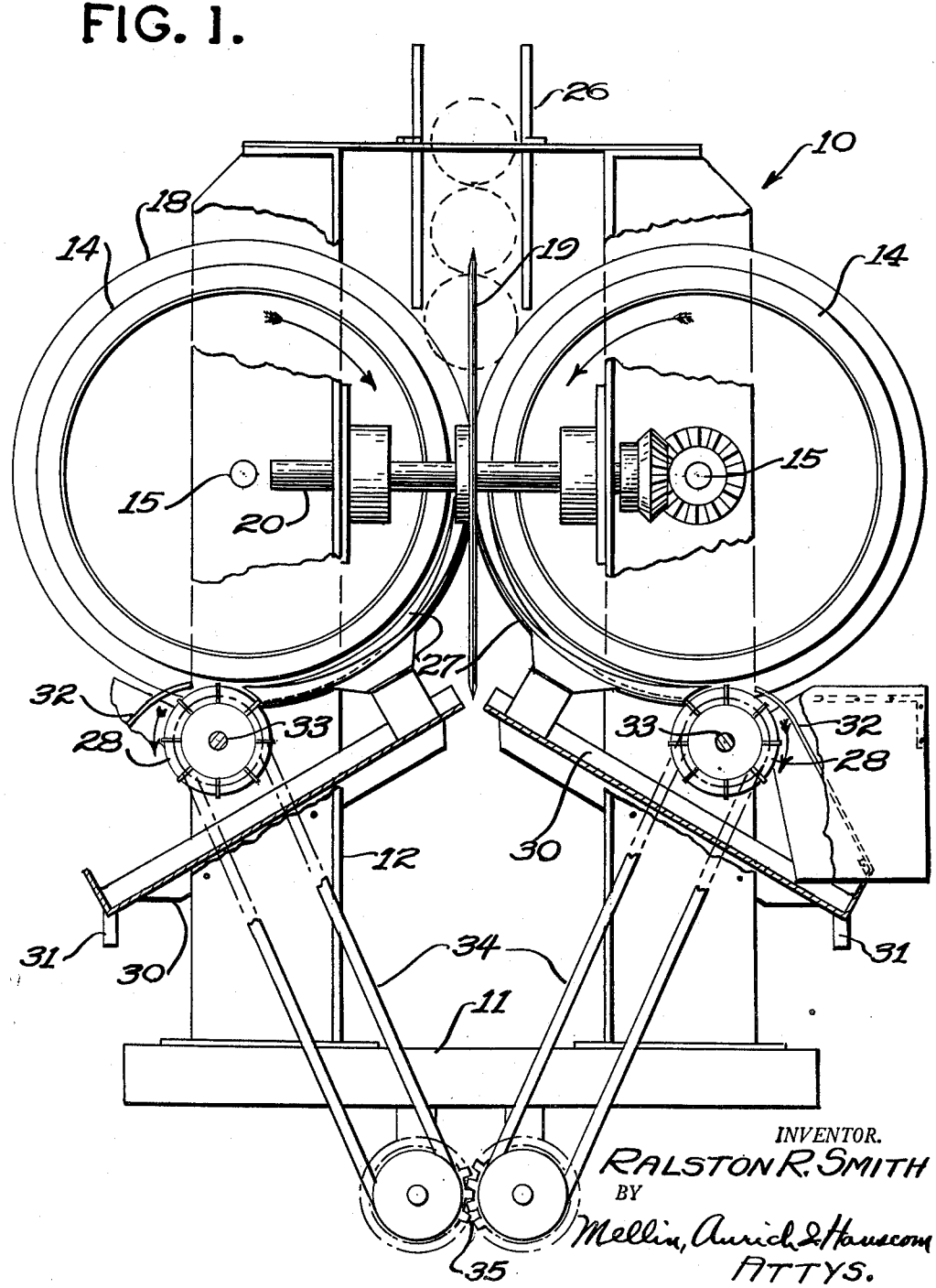
Fig. 1 is a view in side elevation of the machine with parts broken away and in section to more clearly disclose certain features of construction.

Referring more particularly to the accompanying drawings, 10 indicates a machine for extracting the juice from citrus fruits. This machine comprises a base 11 and an upright frame structure 12 which, of course, supports the operating mechanism of the machine. Journaled on this frame are two conveying rolls 14 which are identical in construction and which are mounted on parallel shafts 15 for rotation in opposite directions, as indicated by the arrows in Fig. 1.

Each conveying roll is formed with a rigid outer rim 16, surrounding which is an annular band 17 formed of such pliable and yielding material as sponge rubber. This yielding or pliable annular band 17 provides the conveying rolls 14 with a pliable or yielding peripheral surface.

The sponge rubber which I refer to is that type of commercial rubber which is an elastic material which has a low compression modulus. It is porous and extremely pliable and, in fact, the band 17 is of such low compression modulus that it is sufficiently pliable to permit a segment of a citrus fruit to be embedded therein by pressure insufficient to crush and disintegrate the fruit segment.

Figure 2:
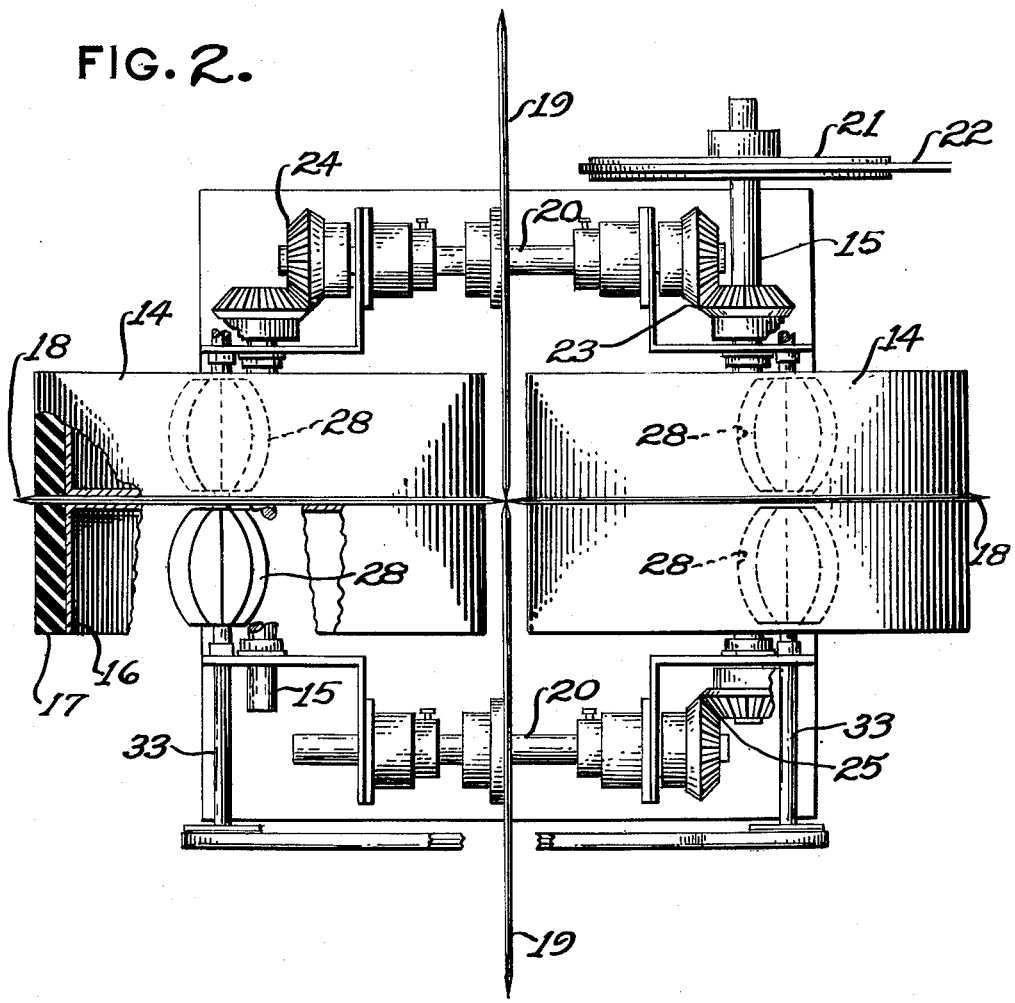
Fig. 2 is a view in plan of the operating elements of the machine disclosing the drive mechanism thereof with parts broken away and in section to more clearly disclose certain features of construction.

Fixed concentrically of each conveying roll 14 and midway between its ends is an annular severing blade 18 of an external diameter greater than the external diameter of the roll 14. The marginal edge of the severing blade 18 is sharpened, of course, as illustrated. The shafts 15 of the rolls 14 are disposed in the same horizontal plane. The rolls are also in exact register with each other, as shown in Fig. 2, so that the severing blades 18 thereof will be in alignment. The spacing between the shafts 15 and the diameter of the severing blades 18 is such that the severing edges of the two blades substantially meet, so that a fruit passing downwardly between the rolls will be severed by the blades 18.

It should also be pointed out that the external diameter of the rolls 14 is such that the spacing therebetween, where their peripheries are contiguous, is slightly less than the diameter of the smallest fruit which will be fed therebetween.

It is obvious from the foregoing that if a fruit is dropped between the rolls midway between their ends and the rolls are revolving in the direction of the arrows shown in Fig. 1, that the fruit will be severed in halves. It is my object, however, to quarter the fruit, and for this purpose I provide circular severing blades 19 of the same diameter as the severing blades 18, but mounted with their axes on the same horizontal plane as the severing blades 18 but at right angles thereto. These severing blades 19 are fixed on shafts 20 carried by the frame structure 12 and disposed, of course, at right angles to the shafts 15 of the rolls 14. The shafts 20 are spaced equal distances from the blades 18 at opposite sides of the rolls 14.

The position of the severing blades 19 on the shafts 20 is such that their sharpened marginal edges substantially meet at the meeting point of the edges of the severing blades 18, so that a fruit delivered between the conveying rolls 14 centrally between their ends will be severed into quarters. The blades 19 are driven in opposite directions, but in the same general direction as the severing blades 18 and at approximately the same speed.

To effect the drive of these elements, one of the shafts 15 is provided with a pulley 21 driven from a prime mover through a belt 22. This drive will, of course, be imparted to the roll 14 on that shaft and will be transmitted through a pair of bevel gears 23 to one of the shafts 20, and thence through a set of bevel gears 24 to the shaft 15 of the opposite roll 14. The shaft 20 will be driven from the driven shaft 15 through a pair of bevel gears 25.

Supported by the frame above the conveying rolls 14 is a suitable chute 26 into which fruit may be fed continuously one by one. This chute is so superposed over the rolls 14 that it will allow the fruit to discharge one by one between the rolls midway between the ends thereof so that the severing blades 18 and 19 will effectively quarter the same.

Obviously, upon severing of the fruit there will be two quarters thereof at the periphery of each roll 14, which two quarters will be located on opposite sides of the severing blade 18 thereof. To receive these quarters I provide four arcuate tracks 27, two for each roll, which tracks are supported from the frame structure. One of the tracks of each roll is positioned at one side of the severing blade 18 thereof and the other track at the opposite side of the severing blade 18. The curvature of these tracks conforms somewhat to the external periphery of the roll 14 with which it is associated, and the tracks extend from a point just below the horizontal center of the rolls to a point just short of the vertical center of the roll, as illustrated in Fig. 1.

Each track is substantially concentrically disposed with respect to its associated roll 14 and is spaced slightly from the external periphery thereof. Each track is V-shaped in cross-section and is twisted longitudinally with its upper end disposed to conform to the position of the quarter of fruit to be deposited therein, and its lower end is disposed so that the rind of the fruit will lie as nearly as possible parallel to the peripheral surface of the roll 14 with the apex of the quarter of fruit extending radially outward therefrom. The longitudinal axis of the quarter will, of course, be disposed in the plane of revolution of the roll.

Thus, it is seen that the tracks receive the quarters of fruit as each fruit is severed into quarters, and gradually changes the position of each quarter to the position just described, in which it is disposed as it is positioned for reaming. The fruit is conveyed along the arcuate tracks by engagement thereof with the pliable, compressible, peripheral surface of the rolls 14.

To extract the juice from the quarters of fruit as they are so delivered, I provide at the lower end of each track a reamer or reaming element 28. The axes of these rotary reaming elements are parallel to the axes of the rolls 14, and the outer peripheries of the reamers 28 are disposed at a distance from the outer peripheries of the rolls 14 approximately that of the average thickness of skin of the fruit being operated upon. Thus, as the quarters of fruit, which are indicated by the numerals 29 in Figs. 3 and 4, are conveyed along the arcuate tracks 27, they discharge from the lower ends of the tracks to between the peripheries of the rotary reaming elements 28 and the pliable peripheries of the rolls 14.

Figure 3:
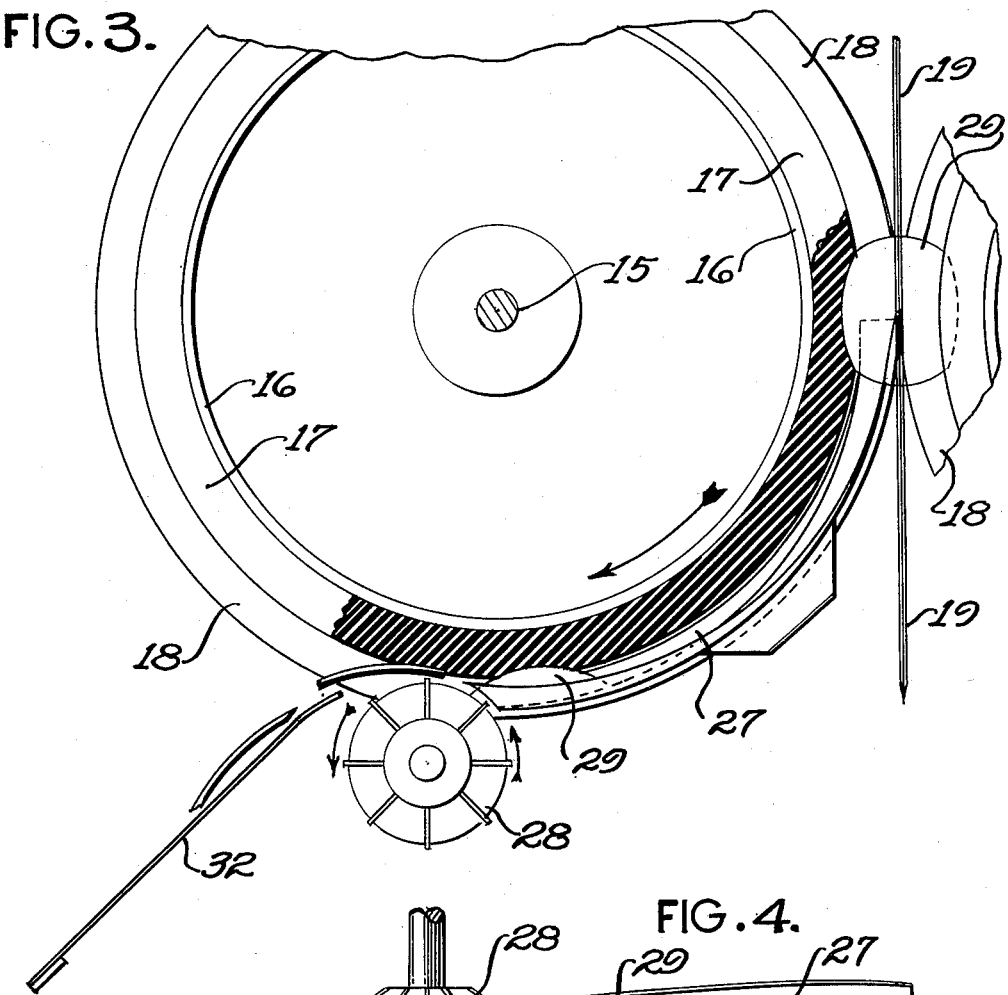
Fig. 3 is an enlarged fragmentary view in elevation and in section of one of the conveyor rolls disclosing its construction and the manner in which the fruit juice is extracted from the quartered fruit.
Figure 4:
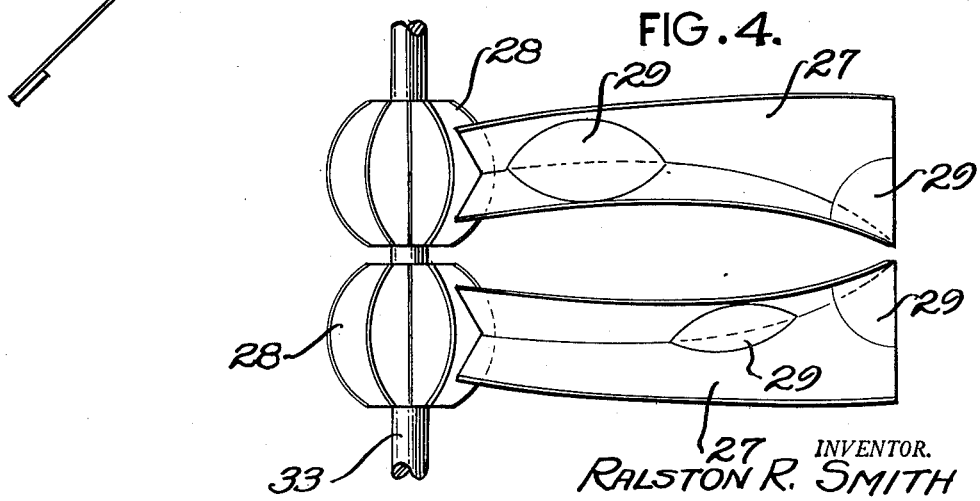
Fig. 4 is an enlarged fragmentary view showing the arcuate tracks for positioning the quartered fruit into juice extracting position prior to reaching the reamers.

The reaming elements 28 revolve in the direction of the arrows shown in Fig. 3, but at a greater peripheral speed than that of the rolls so that an excellent juice extracting action is obtained. Due to the pliability or compressibility of the peripheries of the rolls 14, the reaming elements 28 are enabled to extract all of the juice of the quarters without contaminating that juice by also extracting the juice of the rind and fibers of the fruit.

The juice extracted runs downwardly into inclined trays 30 having spouts 31 so that the juice may be directed to suitable containers. Stripper plates 32 are provided on which the rinds are deposited so that they may be discharged separately from the machine.

It will be noticed that the reaming elements 28 are fixed on shafts 33 carried by the frame structure 12 and are driven by a driving mechanism including belts 34 and intermeshing gears 35, which in turn may be driven in any suitable manner from the shaft 15, or, if desired, by a separate driving element. It is necessary, however, that the reamers 28 be driven at a peripheral speed considerably greater than the peripheral speed of the rolls 14 in order to obtain the proper juice extracting action.

In operation of the device, it is constructed and assembled as shown in the drawings and fruit is delivered to the chute 26. The fruit will descend through the chute 26 one by one and be quartered by the action of the severing blades 18 and 19, and thence be discharged into the arcuate tracks 27 which will position the fruit with respect to the peripheries of the rolls 14 for reaming. When they are so positioned, the conveyor rolls 14 will deliver them from the tracks and over the reaming elements 28, which will ream the quarters in a manner extracting all of the fruit juice therefrom, which juice will discharge onto the trays 30 and be delivered through the spouts 31. The rinds with the fibrous pulp attached will discharge onto the stripper plates 32 and be separately discharged from the machine.

Due to the fact that the conveyor rolls 14 have a yielding, pliable surface, they will act efficiently in conveying the fruit over the reamers 28 and enable the reamers to extract the juice without extracting the juice of the rinds and the fibers and thus contaminate the fruit juice.

From the foregoing it is obvious that I have provided an extremely simple and efficient device for extracting the juices from citrus fruit, and while I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In an apparatus of the character described, a pair of contiguous and oppositely rotating conveying rolls having parallel axes disposed on the same horiontal plane, each roll having a severing blade projecting from its periphery concentrically thereof and midway between its ends, the peripheries of said rolls being pliable, said rolls being aligned axially, rotary severing elements arranged at right angles to the severing blades on the rolls and disposed midway between the axes thereof whereby the cutting outer peripheries of the severing blades and elements will substantially meet at a common point midway between the peripheries of the rolls whereby a fruit fed between the rolls and gripped by the peripheries thereof will be severed into segments as it feeds between the rolls, rotating reaming means between which and the rolls the severed segments are conveyed by the rolls for extracting the juice therefrom.

2. In an apparatus of the character described, a pair of contiguous and oppositely rotating conveying rolls having parallel axes disposed on the same horizontal plane, each roll having a severing blade projecting from its periphery concentrically thereof and midway between its ends, the peripheries of said rolls being pliable, said rolls being aligned axially, rotary severing elements arranged at right angles to the severing blades on the rolls and disposed midway between the axes thereof whereby the cutting outer peripheries of the severing blades and elements will substantially meet at a common point midway between the peripheries of the rolls whereby a fruit fed between the rolls and gripped by the peripheries thereof will be severed into segments as it feeds between the rolls, rotating reaming means adjacent the peripheries of the rolls at a point circumferentially spaced thereabout from the point of severance of the fruit and between which and the rolls the segments are conveyed by the rolls, and means for guiding the segments from the point of severance to between the reaming means and the rolls.

3. In an apparatus of the character described, a pair of contiguous and oppositely rotating conveying rolls having parallel axes disposed on the same horizontal plane, each roll having a severing blade projecting from its periphery concentrically thereof and midway between its ends, the peripheries of said rolls being pliable, said rolls being aligned axially, rotary severing elements arranged at right angles to the severing blades on the rolls and disposed midway between the axes thereof whereby the cutting outer peripheries of the severing blades and elements will substantially meet at a common point midway between the peripheries of the rolls whereby a fruit fed between the rolls and gripped by the peripheries thereof will be severed into segments as it feeds between the rolls, rotating reaming means adjacent the peripheries of the rolls at a point circumferentially spaced thereabout from the point of severance of the fruit and between which and the rolls the segments are conveyed by the rolls, means for guiding the segments from the point of severance to between the reaming means and the rolls, said guiding means turning the segments from the point of severance to the point of delivery between the reaming means and the rolls so as to position each segment so that its longitudinal axis extends tangentially with respect to the roll with the apex of the segment disposed radially with respect to the roll and with the outer surface of the rind lying substantially flatwise against the outer surface of the roll.

4. In an apparatus of the character described, a pair of contiguous and oppositely rotating conveying rolls having parallel axes disposed on the same horizontal plane, each roll having a severing blade projecting from its periphery concentrically thereof and midway between its ends, the peripheries of said rolls being pliable, said rolls being aligned axially, rotary severing elements arranged at right angles to the severing blades on the rolls and disposed midway between the axes thereof whereby the cutting outer peripheries of the severing blades and elements will substantially meet at a common point midway between the peripheries of the rolls whereby a fruit fed between the rolls and gripped by the peripheries thereof will be severed into segments as it feeds between the rolls, rotating reaming means adjacent the peripheries of the rolls at a point circumferentially spaced thereabout from the point of severance of the fruit and between which and the rolls the segments are conveyed by the rolls, means for guiding the segments from the point of severance to between the reaming means and the rolls, said guiding means turning the segments from the point of severance to the point of delivery between the reaming means and the rolls so as to position each segment so that its longitudinal axis extends tangentially with respect to the roll with the apex of the segment disposed radially with respect to the roll and with the outer surface of the rind lying substantially flatwise against the outer surface of the roll, the peripheral speed of the rotating reaming means being greater than the peripheral speed of the rolls.

RALSTON R. SMITH.

REFERENCES CITED

The following references are of record in the file of this patent:

UNITED STATES PATENTS

| Number | Name | Date |
| --- | --- | --- |
| 1,848,273 | Ryder | Mar. 8, 1932 |
| 2,065,544 | Strong | Dec. 29, 1936 |
| 2,183,769 | Hawkins | Dec. 19, 1939 |
| 2,212,066 | Fry | Aug. 20, 1940 |
| 2,235,744 | Gould | Mar. 18, 1941 |
| 2,236,916 | Polk, Sr., et al. | Apr. 1, 1941 |
| 2,241,081 | Clark | May 6, 1941 |
| 2,259,332 | Winkelman | Oct. 14, 1941 |
| 2,265,649 | Krehbiel | Dec. 9, 1941 |
| 2,288,756 | Thompson | July 7, 1942 |
| 2,309,328 | Polk, Sr., et al. | Jan. 26, 1943 |
| 2,337,261 | McKinnis | Dec. 21, 1943 |
| 2,344,711 | McNutt et al. | Mar. 21, 1944 |
| 2,360,964 | Moroni | Oct. 24, 1944 |